United States Patent [19]
Pease

[11] 3,982,644
[45] Sept. 28, 1976

[54] SIDE SHIFT AND SKEWING DEVICE FOR VAN CARRIER

[75] Inventor: Bobbylee Pease, Battle Creek, Mich.

[73] Assignee: Clark Equipment Company, Buchanan, Mich.

[22] Filed: May 19, 1975

[21] Appl. No.: 578,458

[52] U.S. Cl. .............................. 214/394; 294/81 SF
[51] Int. Cl.² ........................ B60P 1/02; B66C 1/00
[58] Field of Search ........... 294/67 R, 67 D, 67 DA, 294/81 R, 81 SF; 212/14; 214/390, 392, 394, 396, 620, 621

[56] References Cited
UNITED STATES PATENTS

| | | |
|---|---|---|
| 3,146,903 | 9/1964 | Bjorklund ........................... 214/394 |
| 3,655,081 | 4/1972 | Monk ................................. 214/394 |
| 3,703,243 | 11/1972 | Monk ................................. 214/394 |
| 3,874,719 | 4/1975 | Goyarts .......................... 294/81 SF |

*Primary Examiner*—Johnny D. Cherry
*Attorney, Agent, or Firm*—John C. Wiessler

[57] ABSTRACT

A spreader frame for van carriers for engaging, lifting and transporting freight containers which is chain supported at both ends from a carrier mounted lifting arch and which is connected to the carrier frame by a guide beam at one end only. At the said one end there is connected between the guide beam and the spreader frame three hydraulic cylinders, one of which extends generally transversely of the frame for side shifting it on the guide beam, and the other two of which extend generally longitudinally at opposite sides of the frame for skewing it on the guide beam.

4 Claims, 4 Drawing Figures

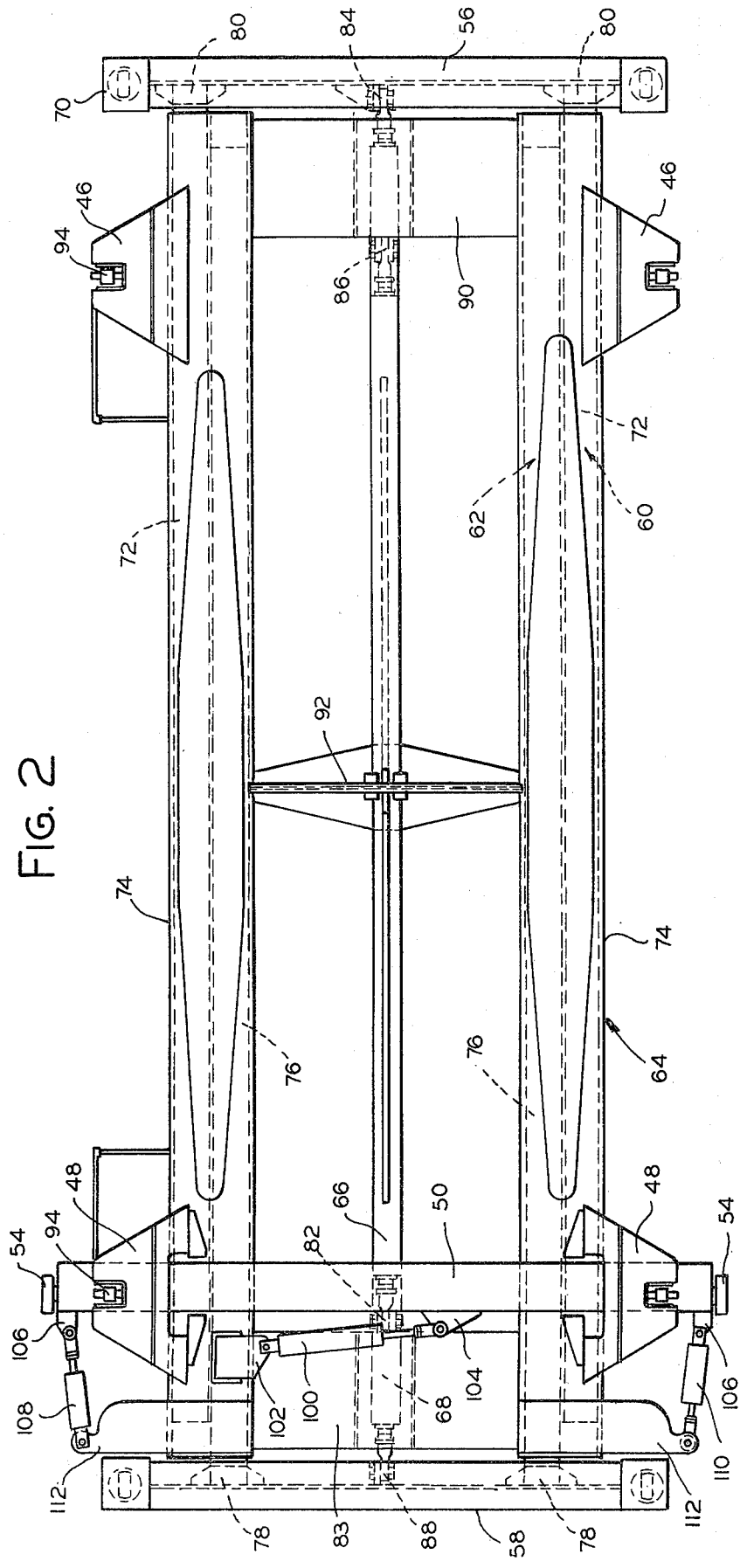
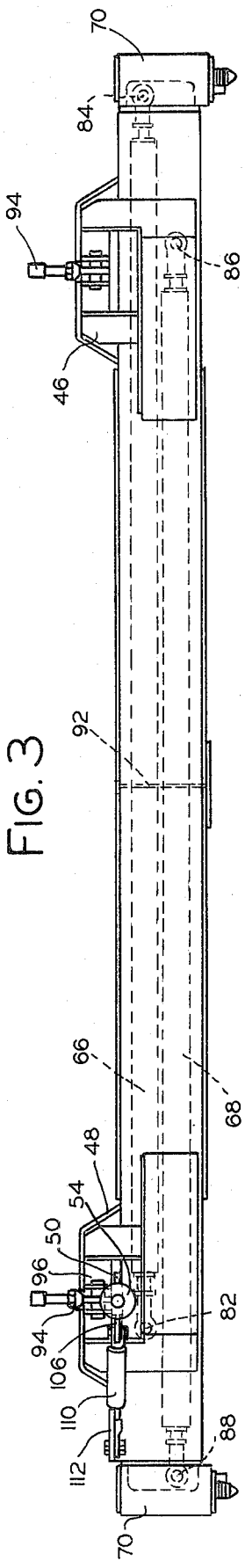
Fig. 2
Fig. 3

SIDE SHIFT AND SKEWING DEVICE FOR VAN CARRIER

BACKGROUND OF THE INVENTION

The field of art to which the invention pertains is known as "containerization", and more particularly to van carrier spreader frames for handling containers.

The present invention is concerned with a spreader frame design which, particularly in respect of telescopic spreader frames, improves the visibility of the operator through the frame. Poor visibility has been a continuing problem in van carrier container handling operations. Also, relatively complex, costly and excessively heavy spreader frames have evolved which have usually heretofore been connected at both ends into side frame structure of the van carrier, although one known prior frame design has been connected at one end only into side frame structure of the van carrier. In both such latter types of spreader frames the side-shifting and skewing system has involved actuating devices mounted from both end portions of the frame.

SUMMARY

My invention comprises an improved spreader frame of relatively simple construction, low cost, and relatively small bulk and weight, which also provides improved operator visibility through the frame, and which is applicable to either telescopic or non-telescopic spreader frame constructions. In carrying out the invention I have provided a frame construction which is connected semi-positively into the sides of the vehicle frame at one end only, from which end is mounted spreader frame side shifting and skewing mechanism.

It is a primary object of the invention to provide a relatively simple, low cost, low weight and relatively high visibility spreader frame.

Other objects and features of the invention will become apparent to persons skilled in the art in view of the detailed specification which follows.

BRIEF DESCRIPTION OF THE DRAWING

FIG. 2 is a plan view of the spreader frame shown in a retracted condition;

FIG. 3 is a side view of the frame shown in FIG. 2; and

DESCRIPTION OF THE PREFERRED EMBODIMENT

Figure 1:
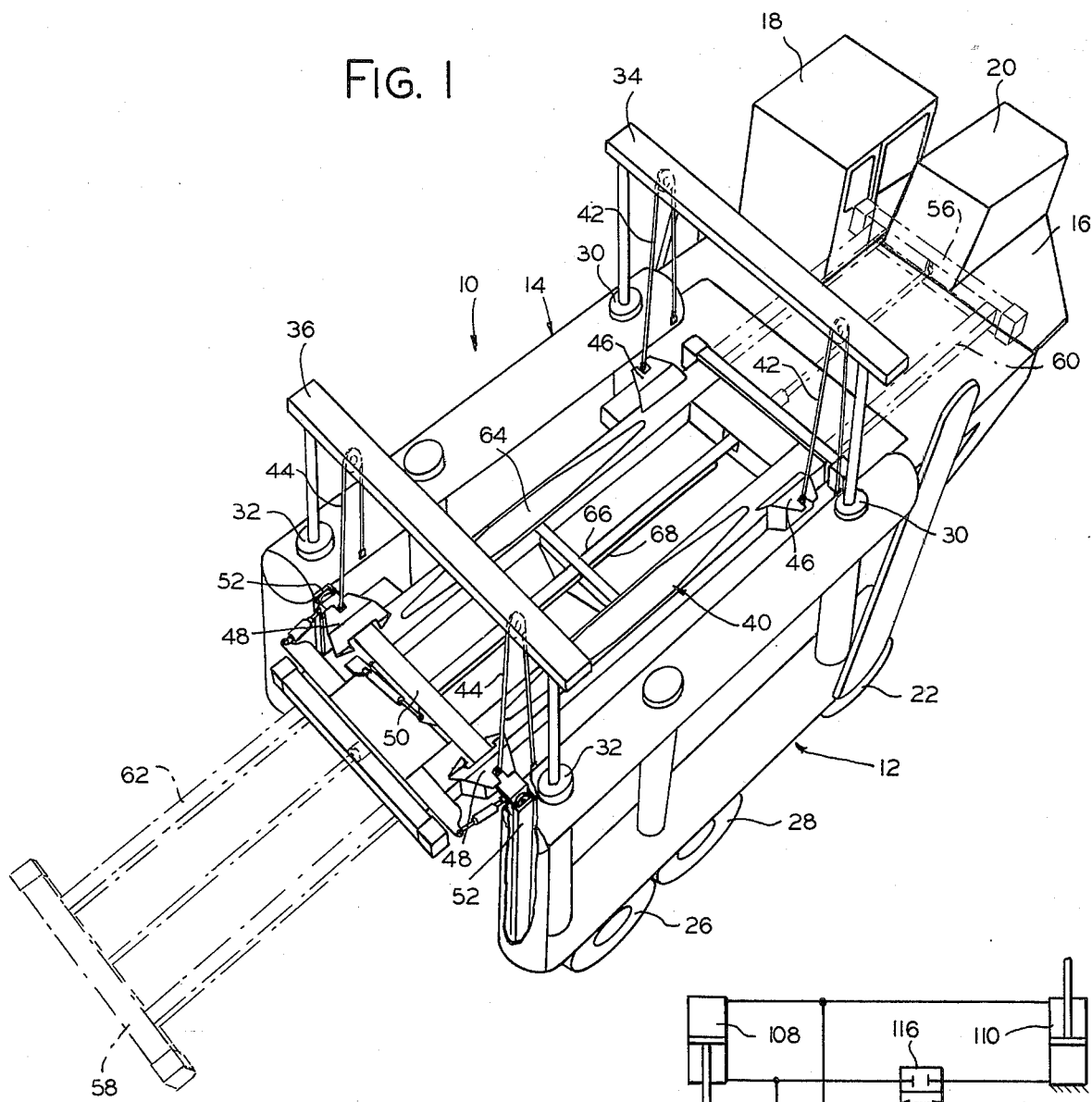
FIG. 1 is a perspective view from above the rear quarter portion of a van carrier vehicle in which is mounted a telescopic spreader frame which embodies my invention.

Referring now in detail to the drawing, a straddle type van carrier is illustrated generally by numeral 10 having an open bay formed between a pair of longitudinally extending parallel side frame constructions 12 and 14 secured together at the rear ends by a transverse frame from which is suitably supported a rearwardly cantilevered operator's platform 16 having an operator's station 18 and an engine and transmission compartment 20 located thereon. The power train components are suitably connected to a pair of steer drive rear wheels 22 through a differential drive train and sprocket mechanism, not shown. Additional pairs of dirigible wheels 26 and 28 are mounted on each side frame in tandem relationship. Two pairs of longitudinally spaced hydraulic lift cylinder assemblies 30 and 32 are mounted in opposite end portions of the U-shaped bay formed by the side and end frame assemblies of the vehicle, and are connected in pairs as shown to the opposite ends of each of a pair of transversely extending lifting arch beams 34 and 36 which are actuated vertically by hydraulic cylinder assemblies 30 and 32.

The construction of the van carrier 10 is not a part of this invention, except as it may be in functional combination with the spreader frame to be described in detail below, and so it need not be described in further detail herein.

A spreader frame assembly is shown generally at numeral 40. It is suspended in the U-shaped vehicle frame from lifting arches 34 and 36 by suitable chain and sprocket mechanism or pairs of cables and sheaves 42 and 44 located adjacent each cylinder assembly 30 and 32. The chains are anchored to the vehicle frame at their one ends and to pairs of transversely spaced lift bracket members 46 and 48 at the opposite ends such that the lift frame is elevated and lowered relative to the lifting arches at a 2:1 ratio. At the open end only of the U-shaped frame is located a guide and skew beam 50 which extends through lift brackets 48 in a manner to be described for connection to a pair of channel members 52 by means of roller assemblies 54 mounted from the opposite ends of beam 50. Channels 52 are mounted rigidly in end members of the side frames of the carrier. The purpose of beam 50 is to control and guide frame 40 in side shifting and skewing motions within the open bay of the van carrier, as will be described below.

Extension of the spreader frame is represented in FIG. 1 by the extended broken line positions of opposite transverse beam ends 56 and 58 which are mounted at the ends of opposed telescopic frame sections 60 and 62, all mounted in and in telescopic relationship to a fixed center frame assembly 64. A pair of oppositely extending hydraulic cylinder and piston assemblies 66 and 68 are mounted in and form a part of the spreader frame, being connected to extend and retract to predetermined positions the telescopic frame sections 60 and 62. Such cylinder-piston construction per se and as combined in a telescopic frame assembly is covered in co-pending application Ser. No. 578,445, filed May 19, 1975, in the names of Simpson and the present applicant (common assignee).

Each of end beams 56 and 58 has mounted at opposite ends thereof a twist-lock assembly 70 of well-known type for engaging upper corner casting assemblies of containers suitable to be engaged by the spreader frame. Telescopic section 60 comprises a pair of transversely spaced, longitudinally extending box beams 72 nested within side rails 74 of center fixed section 40 of the frame for extension outwardly in one direction and in outward straddling relation to a pair of transversely spaced and longitudinally extending box beams 76 of the other telescopic frame section 62, also mounted inside of center section 64. Transverse end beam 58 is secured to the projecting ends of beams 76 at 78, and end beam 56 is secured to the projecting ends of beams 72 at 80. The extension cylinder and piston assembly 66 extends longitudinally and centrally of the frame and is connected pivotally at its fixed end to a bifurcated bracket and pin assembly 82 which is secured to a transverse plate 83 connected to the one ends of beams 74, and at the opposite movable end to beam 56 at a bracket and pin assembly 84. Extensible cylinder and piston assembly 68 is mounted beneath and in the vertical plane of cylinder 66, being somewhat offset longitudinally of assembly 66, and is connected in a similar manner at 86 to a transverse plate 90 which is secured at its opposite ends to the one ends of center beams 74, and to end beam 58 at 88. A central transverse support assembly 92 is connected to center beams 74 and supports the cylinder and piston assemblies adjacent the center portions thereof. Chain connector devices 94 are secured suitably to pairs of lift bracket assemblies 46 and 48 for connection to pairs of chains 42 and 44. Guide and skew beam 50 extends through openings 96 in bracket assemblies 48 and is connected at its opposite ends by rollers 54 into telescopic beam assemblies 52 in the side frames of the van carrier as previously described.

Skewing and side shifting of the spreader frame in the bay of the van carrier is accomplished as follows: A single generally transverse double-acting hydraulic cylinder 100 is pivotally connected at its base end to a bracket 102 secured to the one center beam 74 and at its rod end to a bracket 104 secured to guide beam 50. To opposite outer ends of guide beam 50 is pivotally secured at brackets 106 the rod end of a short stroke double-acting skew cylinder 108 and the base end of a second such skew cylinder 110, the opposite ends of said skew cylinders being connected pivotally to a pair of brackets 112 which are secured to the one ends of center beams 74 and extend transversely outwardly in opposite directions therefrom. Pressurizing cylinder 100 in one direction or the other causes the spreader frame to shift substantially transversely in one direction or the other in the U-shaped bay of the van carrier, guide beam 50 functioning to provide a reaction point at bracket 104 for cylinder 100 and to maintain guided transverse movement of the frame on pairs of chains 42 and 44. In this regard it has been found that although the side shift cylinder is located adjacent one end of the center fixed section of the frame that substantially transverse movement of the entire frame occurs without binding on guide beam 50, eliminating the need for any similar guide beam at the opposite end of the frame.

Pressurizing skew cylinders 108 and 110 in opposite directions, i.e., both piston head ends or both rod ends, effects a force couple on the one end of the spreader frame through brackets 112 which causes a skewing motion of the entire frame in the open bay of the carrier, limited by the clearance between beam 50 and openings 96 in brackets 48. It will be noted that my construction affords relatively good operator visibility from cab 18 through the spreader frame for aiding in the precise location thereof to engage containers. Better visibility results from the novel structure which minimizes the "clutter" of structural elements and components in the spreader frame which heretofore has tended to obscure the operator's vision through it.

Figure 4:
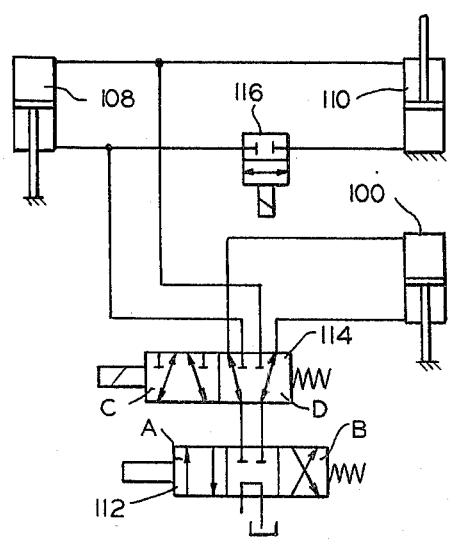
FIG. 4 is a schematic of the hydraulic system for adjusting the position of the frame in a horizontal plane when mounted in the van carrier.

The control circuit for cylinders 100, 108 and 110 includes, as shown in FIG. 4, an open-center double acting spool valve 112 having operative sections A and B, and a solenoid actuated valve 114 having operative sections C and D and selectively connectable either to cylinder 100 or to the pair of cylinders 108 and 110. In addition, a third normally closed solenoid actuated valve 116 normally locks in position cylinders 108 and 110 and is operative when energized to interconnect these cylinders so as to permit skewing of the spreader frame in either direction when valve 114 is operative on valve section C and valve 112 is operative on either section A or B. When valve 114 is in the position shown, which may be its normal operative position, the spreader frame will be side shifted in one direction or the other upon manual actuation of valve 112 to valve section A or B. Of course, with valve 112 remaining in open center position as shown, all cylinders are maintained in hydraulically locked positions, and the circuit is inoperative.

It will be understood that the invention may be as well utilized in a non-telescopic frame adapted for handling 20' containers only, for example, as in the telescopic frame for the handling of containers of various lengths. In such a limited application the visibility through the framework would be further improved in that the width of present center beams 74 would be substantially reduced inasmuch as there would be no requirement for housing telescopic side-by-side beams 72 and 76, and, of course, extension cylinders 66 and 68 would not be a part of the construction, although some trusswork in the open portion of the rectangular frame would be required to rigidify it. In addition to the improvement in operator visibility, my invention substantially reduces the cost and weight of spreader frames.

It will be apparent to those skilled in the art that various changes in the structure and relative arrangement of parts may be made without necessarily departing from the scope of the invention.

I claim:

1. In a van carrier vehicle having a horizontally extending U-shaped frame forming an open bay for embracing the load to be transported by the vehicle, a pair of transversely spaced motors mounted upon opposite legs of the U-shaped frame in each end portion thereof, lifting arch means connecting the motors of each such pair of hoist motors above the U-shaped frame for elevation therewith, a spreader frame embraced by the U-shaped frame and connected by flexible chain or cable means to the lifting arch means for elevation therewith and with said pairs of hoist motors and load lifting means depending from opposite end portions of the spreader frame, said spreader frame being movable downwardly with the lifting arch into a position atop a container to be engaged wherein said lifting means are registrable in locking relation with upper portions of the container so that the container may be elevated within the U-shaped frame, a guide beam extending transversely through one end portion only of the spreader frame having opposite ends thereof engaging a pair of transversely spaced upright channel sections secured in opposed facing relation in one end portion of the U-shaped frame and elevatable therein, a pair of hydraulic actuator cylinders connected between opposite end portions of said guide beam and opposite sides of the spreader frame for causing said spreader frame to skew in one direction or the other in the bay of the U-shaped frame and on said guide beam, and a side shift cylinder connected to said guide beam and to the spreader frame for actuating the latter transversely of the bay of the U-shaped frame and on said guide beam, the end of said spreader frame opposite from said guide beam being freely suspended from said chain or cable means without other connection to the U-shaped frame.

2. A van carrier vehicle as claimed in claim 1 wherein the pair of skew cylinders extend generally longitudinally of the spreader frame and the side shift cylinder extends generally transversely thereof.

3. A van carrier vehicle as claimed in claim 1 wherein said spreader frame is extensible and includes a center fixed section supported by said chain or cable means and which is connected to said guide beam, said side shift and skew cylinders being connected to said center section, first and second telescopic sections being nested in said center section and extensible longitudinally outwardly thereof in opposite directions for engaging containers of different lengths.

4. A van carrier vehicle as claimed in claim 3 wherein a pair of opposed extensible cylinder assemblies are mounted in the center frame section and in the same vertical plane, the opposite ends being respectively connected to said first and second extensible sections.

* * * * *